United States Patent
Vogel et al.

[15] 3,643,892
[45] Feb. 22, 1972

[54] RIBBON-FEEDING SYSTEM

[72] Inventors: Charles A. Vogel, Sunnyvale; John A. Cuvelier, Mountain View, both of Calif.

[73] Assignee: Newell Industries Inc., Sunnyvale, Calif.

[22] Filed: Aug. 27, 1969

[21] Appl. No.: 853,428

[52] U.S. Cl. ............................................242/192, 226/193
[51] Int. Cl. .................................................................G11b 15/32
[58] Field of Search..................242/192, 208, 209, 210, 207, 242/206; 226/188, 192, 193

[56] References Cited

UNITED STATES PATENTS

| | | | |
|---|---|---|---|
| 3,281,038 | 10/1966 | Gwillim | 226/193 X |
| 3,405,855 | 10/1968 | Daly et al. | 226/193 X |
| 3,408,016 | 10/1968 | Ganske et al. | 242/192 |
| 3,468,497 | 9/1969 | Kelley | 242/209 X |

*Primary Examiner*—George F. Mautz
*Attorney*—Flehr, Hohbach, Test, Albritton & Herbert

[57] ABSTRACT

Ribbon-feeding apparatus, e.g., of a type such as a magnetic tape transport, employs a tape drive capstan riding in contact with supply and takeup rolls while the rolls are urged against the capstan. The capstan carries a tire which forms a resilient drive surface to define a ribbon-feeding nip. The drive surface of the capstan is encircled by laterally spaced-apart grooves of a depth and width which drive the rolls at a slower speed than the speed of the driving surface of the capstan in response to application of the compressive forces, i.e., so that the rolls progress "negatively" relative to the direction of rotation of the capstan.

5 Claims, 4 Drawing Figures

INVENTORS
Charles A. Vogel
John A. Cuvelier
BY Flehr, Hohbach, Test,
Albritton & Herbert
Attorneys

RIBBON-FEEDING SYSTEM

BACKGROUND OF THE INVENTION

This invention pertains to rolling drive systems of a type such as used to feed a ribbon of material through the nip formed between a resilient driving roll and a driven roll, as for example, in magnetic tape transport apparatus of a type wherein relatively hard rolls of tape ride against a softer resilient tire formed about a drive capstan (See U.S. Pat. No. 3,370,803).

In U.S. Pat. No. 3,370,803, tape transports have been disclosed having a rotating drive capstan of the type formed with a resilient tire disposed in "rim-driving" relation to both a supply and takeup roll. The tape, trained around the tire of the capstan, is maintained firmly against the tire by pressing the takeup roll against the tire with a force exceeding another force pressing the supply roll against the tire. Thus, the force of compression (or hereafter pressure) at the takeup roll/tire interface is greater than at the supply roll/tire interface.

In the above type of transport, it would appear superficially that the tape speed entering and leaving the zone defined between supply and takeup interfaces should merely be the calculated speed which equals the circumference of the tire multiplied by the revolutions per minute (or other time standard). Such a calculated speed of the tire shall hereinafter be referred to as the "geometric" speed or velocity of the tire.

Thus, in the above-noted patent, it is explained that the calculated geometric speed of the tape rolls can vary from the actual surface speed of a rotating resilient drive capstan by employing changes in compressive forces applied at the interface defined between the rolls and the drive capstan. By urging the relatively harder rolls of tape with increasing force against the resilient drive capstan, the tape speed is locally caused to move faster than the calculated geometric speed of the periphery of the capstan.

In copending application for U.S. Pat., Ser. No. 740,349, assigned to the Assignee herein, a capstan is provided having properties whereby within a limited range of applied pressures, the tape can be made to move slightly slower than the capstan periphery in response to an increase in pressure, so as to be able to apply a slight advantageous "braking" restraint to the tape in the region of the supply roll/capstan interface thereby eliminating any incipient loop tending to develop at that location as explained therein.

It has been observed that by pressing a relatively harder roll of tape against a resilient tire carried on a drive capstan, there will be circumferential elastomeric flow of the tire through the roll/tire interface controlling the speed of the roll. Where this flow causes the surface of the roll to move at greater speed than that of the tire, a positive progression condition of the roll is said to exist. The opposite condition, negative progression, also produced by application of increasing compressive forces to the roll/tire interface (within a limited range) has also been disclosed in the above-referenced patent application.

The concept of negative progression may, at first, appear inconsistent considering that the cross section of the tire is reduced by compression at the interface and that, therefore, an increase in rubber speed should result. However, it has now been discovered that allowing the rubber tire to expand or escape sideways (axially) more easily than to be deflected radially by compression reduces the normal circumferential "flow" of the tire whereby the surface speed of the tire can be reduced to a point less than that of the undistorted tire. In this manner, by rim-driving a roll of tape or other harder roll, negative progression is achieved over a limited lower range of compressive forces acting at the interface between drive capstan and roll.

Thus, it has been discovered that permitting axial displacement of the capstan tire constitutes a highly useful control factor in the construction of a resilient drive capstan whereby negative progression of a tape roll can be developed relatively simply and easily.

In addition, when feeding relatively wide webs of material through a nip defined between a resilient drive roll and a relatively harder driven roll, it has been observed that problems are created if the marginal portions of the web are driven faster or slower than those longitudinal portions disposed intermediate the margins. Thus, it is important that all lateral portions of the web be fed at substantially the same speed.

The feeding of wider sizes of magnetic tape therefore presents not only the problems outlined in the above identified pending application, but also the problem referred to as "cupping" of the tape roll whereby the periphery of the roll after a number of transfers takes on an undesirable concave characteristic across the width of the tape.

SUMMARY OF THE INVENTION AND OBJECTS

In general, there is provided herein a resilient annular driving capstan having a tape-engaging resilient drive surface in contact with a relatively harder roll to define a web-feeding nip, the drive surface of the capstan is formed with encircling, laterally spaced apart grooves of a depth and width to provide negative roll progression in response to application of compressive forces to the driving interface between capstan and roll.

In one embodiment wherein it is desired to eliminate "cupping" of the roll of tape, the grooves formed in the capstan become progressively shallower upon approaching the edges of the capstan tire so as to reduce the axial expansion of the resilient drive surface adjacent the longitudinal margins of the drive surface, in lieu of providing bounding flanges or other side support to the tire.

In this manner, the progression of the tire is uniformly distributed across its width and, therefore, all portions of a tape fed via such a nip will move at the same speed.

In general, it is an object of this invention to provide an improved rolling drive system for feeding a web of material.

It is another object to provide an improved tape transport construction wherein negative progression is readily achieved in response to application of compressive forces.

Additional objects will become more apparent from the following detailed description of preferred embodiments of the invention when considered in conjunction with the drawings.

DETAILED DESCRIPTION OF PREFERRED EMBODIMENTS

Figure 1:
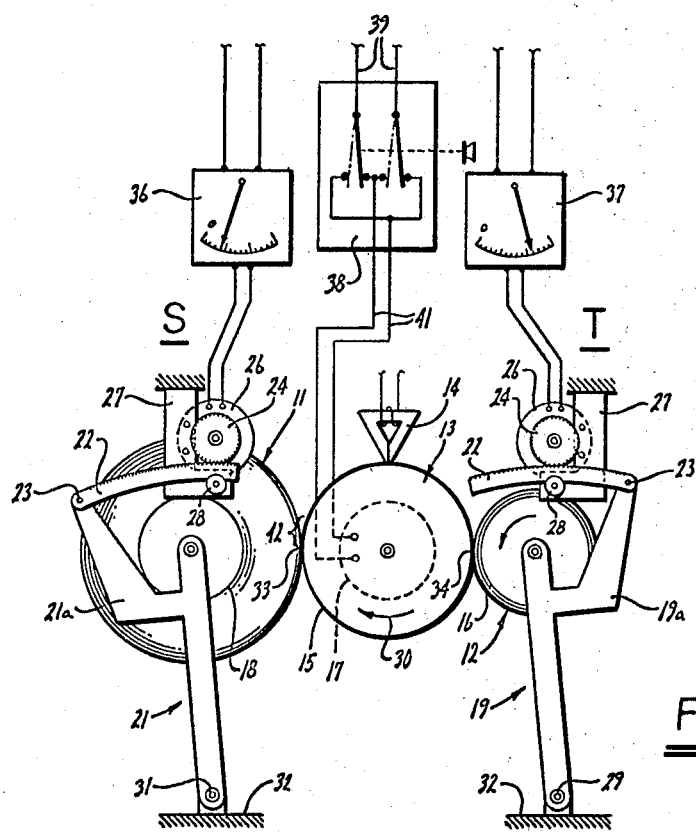
FIG. 1 is a schematic diagram showing a tape transport apparatus, according to the invention.

As generally referred to above, an improved tape transport apparatus has been provided herein of the type shown in FIG. 1 characterized by an improved tire construction carried by the rotating drive capstan.

Referring to FIG. 1, a tape transport apparatus is shown of a type for feeding a length of pliable recording tape wrapped to form a supply roll 11 and to feed the tape to a takeup roll 12 by means of an annular rotating body such as the drive capstan 13 arranged to drive the rolls. Thus, the tape being unwrapped from roll 11 is carried by the peripheral resilient tire surface of capstan 13 past a transducer 14 and onto a hub 16. A drive motor, such as schematically shown at 17, serves to rotate capstan 13 at a predetermined speed of rotation.

Each hub 16, 18 is rotatably carried by suitable means to advance and retreat relative to capstan 13 during feeding of tape.

Thus, each hub 16, 18 is disposed upon the end of a swing arm assembly 19, 21 respectively. Means are provided whereby each arm assembly 19, 21 will be urged toward the peripheral surface of capstan 13. At the upper end of each swing arm assembly 19, 21, a rack 22, pivotally mounted at 23 from an arm extension portion 19a, 21a respectively, serves to cooperate with a drive gear 24 variably powered by a torque motor 26 to vary the compressive force to be applied between an associated roll and the periphery of capstan 13. Torque motor 26 is mounted upon a stationary member 27 forming a portion, for example, of a bed or baseplate (not shown) of the transport apparatus. Each rack 22 rests on a rotatable bearing 28 formed with retaining flanges so as to maintain the teeth of rack 22 and gear 24 in continuous engagement.

Each arm assembly 19, 21 is pivotally mounted at fixed pivot points 29, 31 respectively of the baseplate or frame portion 32 whereby operation of torque motors 26 serves to rotate arm assemblies 19, 21 toward the peripheral surface of capstan 13.

From the foregoing description, it will be readily apparent that as capstan 13 is driven in the direction of arrow 30, tape will be unwrapped from supply roll 11 and wrapped upon takeup roll 12. It will further be evident that rolls 11 and 12 will respectively advance and retreat toward and away from capstan 13 during the transfer of tape.

It has heretofore been known that where an elastomeric coated driving body or element forms a nip with a relatively harder driven rotating body, the effect of urging the two bodies together is to increase the speed of the periphery of the driven body notwithstanding the decrease in driving radius defined on the driving body. This has heretofore been explained variously as an elastomeric flow of the material of the driving body providing the effects, by analogy, to those increases in fluid flow found in constricted portions of a liquid flow line.

In tape transport apparatus of the type shown in FIG. 1, it has heretofore been disclosed to feed tape from the supply roll 11 to the takeup roll 12 while maintaining the intermediate zone of tape under appropriate tension whereby transducing operations can be best conducted. Accordingly, it has heretofore been suggested to urge the supply roll 11 against the resilient tire 15 of capstan 13 at interface 33 (hereinafter supply interface) with a first force while urging the takeup roll 12 against the same tire 15 at interface 34 with a greater force. Thus, meter 36 is shown registering a first power supply to be coupled to torque motor 26 on the supply side of the transport while meter 37 registers a greater power supply to torque motor 26 on the takeup side of the transport.

As noted on the meters, the indicators schematically represent the greater power being supplied on the takeup side whereby the tape at the takeup interface 34 will tend to be driven faster than tape at the supply interface 33.

In order to operate the transport apparatus in a bidirectional manner for both forward and reverse operation, a reversing switch 38 has been coupled to a suitable power supply by leads 39 and is connected to motor 17 by means of leads 41. It is to be understood, of course, that upon reversal of the switch 38, roll 11 becomes the takeup roll and roll 12 then constitutes the supply roll.

Further, at such times as the apparatus is operated in a reverse mode of operation, the power supplied via meters 36, 37 would be reversed so as to create a tendency to feed the tape faster at interface 33 as compared to interface 34.

As mentioned in copending application for U.S. Pat., Ser. No. 740,349, a tendency to form an incipient loop has been observed to be substantially continuously present in that portion 42 of the tape immediately downstream of the supply interface 33. This tendency is believed to have resulted from the motion of the tape relative to the tire surface as opposed by the frictional resistance of the tire surface. This relative motion tends to develop where tape progression is positive at both the supply and takeup interfaces.

In the tape transport disclosed herein as in the above identified application, a resilient annular rotating tire 15 has been formed characterized by the property whereby, for a limited range of applied forces acting to increasingly compress the interface 33, the peripheral speed of the supply roll relative to the tire, can be increasingly slowed, rather than increased, in response to such increases in the applied force.

Figure 4:
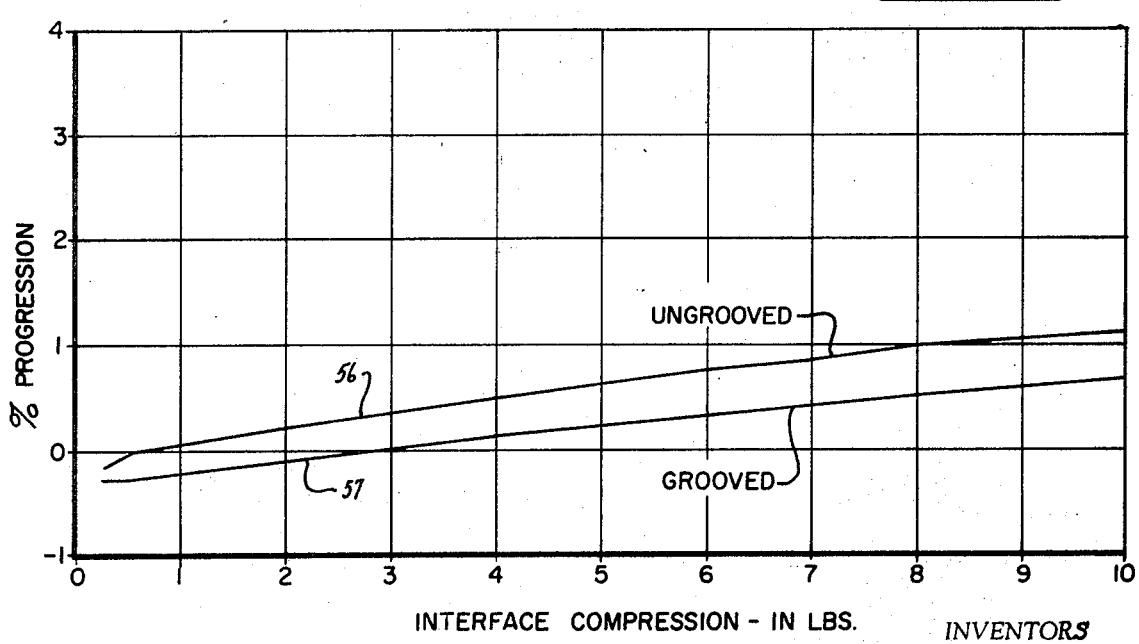
FIG. 4 is a graph illustrating the performance characteristics of a capstan constructed in accordance with the invention to provide negative progression by means of grooves formed in the capstan tire.

Thus, with reference to the graph in FIG. 4, the compressive force applied to the interface between the resilient tire and relatively harder driven roll is plotted on the X coordinate while the percentage progression of the driven roll is plotted on the Y coordinate. Where progression becomes a negative percentage, the driven roll will be moving at a slower surface speed than the driving roll whereby, for example, a tape supply roll will appear to be experiencing a modest "braking" restraint.

When progression becomes a positive percentage, the supply roll can be thought of as tending to overrun the drive capstan.

In FIG. 4 two traces 56, 57 respectively represent the plot of an ungrooved tire and a grooved tire wherein the force applied at the interface between the tire and driven roll is represented along the X axis and the percentage progression of the roll relative to the drive tire is represented along the Y axis.

Both tires were of a hardness of 71 durometer and 3/16-inch thick mounted on a metal hub of a diameter of 5.099 inches. While these tests were carried out at 240 inches per second, substantially the same traces were produced at lesser and greater speeds whereby FIG. 4 is considered to be representative.

Thus, from inspection, it is apparent that the grooving of a resilient drive capstan contributes to negative progression in the driven roll. For example, zero progression occurs in trace 57 under approximately 2.8 pounds of compressive force whereas for an ungrooved tire, as in trace 56, zero progression occurs under approximately 0.7 pounds of force.

By providing negative progression over such an enhanced range of forces, control of tape being fed is rendered less critical since a wider range of forces can be employed.

Annular encircling grooves 40 formed at laterally spaced apart regular intervals across the periphery of tire 15 carried upon the rotating drive hub 43 are of a depth and width forming a ribbed tape-engaging drive surface 44 having properties serving to act in response both to a first compressive force applied at the supply roll relative to the geometric speed of the surface portions of the capstan and also to respond to another compressive force applied at the takeup interface 34 tending to increase the peripheral speed of the takeup roll relative to the geometric speed of the surface portions of capstan 13.

In this way, negative progression is generated at the supply interface 42 while positive progression is generated at the interface 34.

Grooves 40, to be of sufficient width, should accommodate a modest bulging or expansion of the individual ribs 46 defined therebetween to an extent that circumferential flow of the elastomeric material of tire 15 will be sufficiently reduced by the axial expansion of each rib 46 to develop negative progression.

For example, in one instance, where capstan 13 has been arranged to feed pliable magnetic recording tape having a width on the order of 0.5 inch, the grooves 40 penetrate into the tire to a depth on the order of 0.04 inch and width of the grooves is a substantially uniform dimension for all grooves disposed across the entire width of tire 15, each groove being on the order of 0.004 inch wide.

Figure 2:
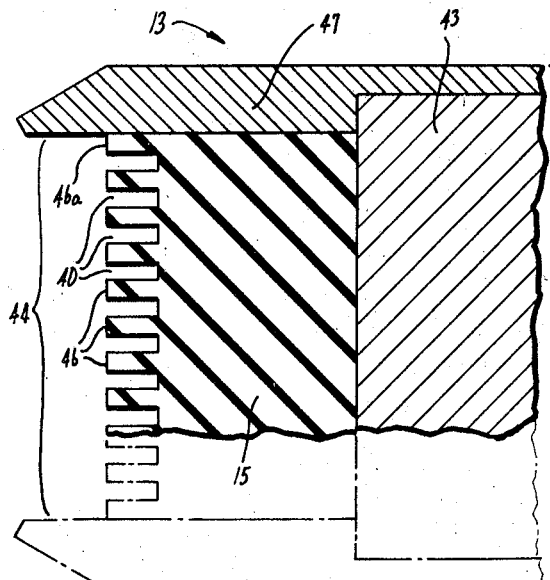
FIG. 2 is an enlarged detail view of a portion of a grooved capstan, according to the invention, for use in the apparatus of FIG. 1 in feeding tapes.

In the embodiment shown in FIG. 2, it is to be observed that a flange 47 has been attached axially of tire 15 so as to provide lateral side support to the endmost rib 46a.

The provision of a flange 47 bounding the side edges of tire 15 and ribs 46 obviously precludes the axial expansion of those outermost ribs 46a of tire 15. By thus restraining ribs 46a from further axial bulging, progression of that portion of the tape roll riding in contact with ribs 46a occurs at a different rate from the speed of movement of those portions cooperating with the remaining intermediate ribs.

In general, the benefits to be gained by the provision of flanges 47 serve to offset, in many circumstances, any disadvantages which may be generated by their causing such a small difference in the speed of various laterally disposed portions of the tape being fed.

Where the ends of the capstan tire are not supported, as by the flanges 47, axial flow of the elastomeric tire material will serve to diminish its circumferential flow whereby the progression of the tape roll in the region opposite the longitudinal margins of the tire will tend to vary from the opposite portion of the tire disposed between the margins.

However, by forming the grooves with progressively shallower depths along the margins of the tire, i.e., progressively nearer the bounding edges of the drive surface 52, the groove depth will tend to feed the tape faster in this region to offset any countervailing slowing of the tape experienced in the same marginal region due to the axial relief at the ends of the tire.

Figure 3:
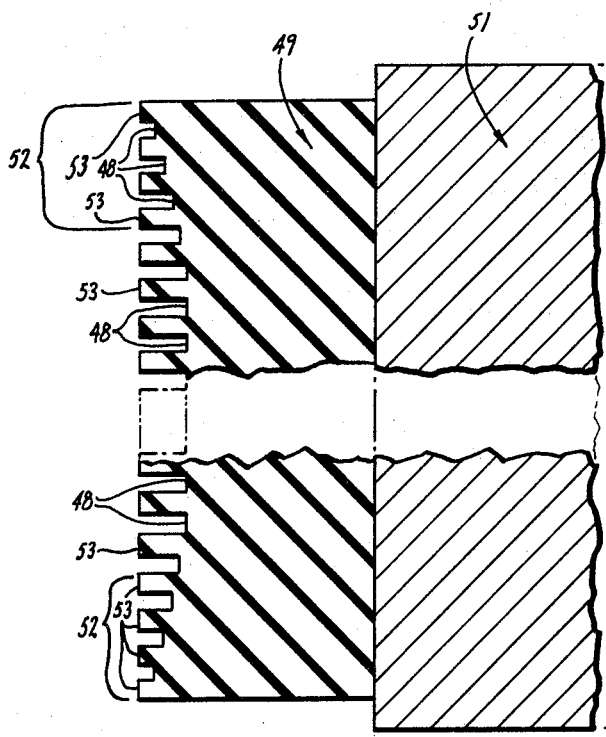
FIG. 3 is an enlarged detail view, according to FIG. 2, of a portion of a grooved capstan, according to another embodiment of the invention, for use in feeding relatively wide tapes.

Thus, according to the embodiment shown in FIG. 3, grooves 48 are formed in a capstan tire 49 carried upon a rigid rotating drive hub 51 as above described. Grooves 48, however, become progressively shallower upon approaching the edges of the capstan at a rate serving to progressively offset changes in progression due to axial expansion of the resilient drive surface 52 formed by the surfaces of those ribs 53 located along the longitudinal margins of the drive surface of tire 49. In this manner, bounding flanges (or other side support to the tire 49) can be eliminated, while maintaining a uniform tire progression across its entire width. Accordingly, all portions of a tape fed through such a nip will move at the same speed.

In the above embodiment, a roll of tape formed by riding in contact with a tire 49 can avoid the problem of generating a concave ("cupping") characteristic to the edge of such a roll of tape.

While it is not specifically noted above, the elastomeric tire material in each instance preferably comprises silicon rubber. This material is believed preferable because its hardness remains constant within a few points over a very wide temperature range.

We claim:

1. In a tape transport of a type for feeding a length of pliable recording tape wrapped to form supply and takeup rolls, apparatus comprising means rotatably supporting the rolls, capstan means disposed in common with both said rolls to form a driving interface with both rolls, means serving to apply a first force urging the takeup roll against the capstan means and to apply a second force urging the supply roll against the capstan means, said capstan means having resilient, annular surface portions, the resilient surface portions including annular, axially spaced grooves encircling the capstan means and of a depth and width forming a ribbed tape-engaging driving surface with properties serving to act in response both to said first compressive force applied at the supply interface and also to said second compressive force applied at the takeup interface tending to diminish the peripheral speed of the supply and takeup rolls relative to the geometric speed of the surface portions.

2. In a tape transport according to claim 1 wherein the depth of said grooves is progressively less for those grooves disposed progressively nearer the bounding edges of said drive surface to tend to feed the tape faster at the margins than at regions therebetween.

3. In a transport of a type for feeding a pliable elongated ribbon of material, a ribbon-engaging and feeding nip comprising a resilient annular driving body, means for driving the body, a rotatable driven body forming a nip with said resilient driving body adapted to receive and feed the ribbon therethrough, the periphery of said driven body being harder than the periphery of said resilient body, annular grooves encircling the driving body, said grooves being laterally spaced to define resilient ribs therebetween, said grooves having a depth and spacing to form said ribs as a ribbed tape-engaging driving surface with properties serving, when said ribs ride in driving relation against said driven body, to act in response to compressive force applied between said driving and driven bodies to feed the ribbon through said nip at a negative progression rate relative to the geometric peripheral velocity of said driving body, and means urging the driving and driven bodies together to develop said properties.

4. In a transport of a type for feeding a pliable elongated ribbon of material, a ribbon-engaging and feeding nip comprising a resilient annular driving body, means for driving the body, a rotatable driven body forming a nip with said resilient driving body adapted to receive and feed the ribbon therethrough, the periphery of said driving body being more resilient than the periphery of said driven body, annular grooves encircling the driving body, said grooves being laterally spaced to define resilient ribs therebetween, said grooves having a depth and spacing serving to reduce the peripheral speed of said driven body and ribbon within said nip relative to the peripheral speed of said driving body in response to compressive force applied between said driving and driven bodies when feeding said ribbon through the nip, and means for applying said compressive force when feeding said ribbon through the nip to reduce said peripheral speed of said driven body.

5. In a tape transport according to claim 1 wherein said means for applying said first and second forces serves to make said first force greater than said second force to cause the supply roll to progress relative to the body at a lesser rate than said takeup roll progresses relative to said body thereby to tension the tape therebetween.

* * * * *